United States Patent
Yonkers

[15] 3,698,749
[45] Oct. 17, 1972

[54] END FITTING
[72] Inventor: Edward H. Yonkers, Wilmette, Ill.
[73] Assignee: Joslyn Mfg. and Supply Co., Chicago, Ill.
[22] Filed: Dec. 31, 1969
[21] Appl. No.: 889,418

[52] U.S. Cl. ................................287/20.3, 52/711
[51] Int. Cl. .......................................F16b 9/00
[58] Field of Search......287/109, 110, 111, 113, 115, 287/65, 75, 78, 20.3, 20.5, 23, 83, 82; 52/704, 711, 230, 223, 227; 24/126.3, 136.3, 263 DD

[56] References Cited
UNITED STATES PATENTS

| | | | |
|---|---|---|---|
| 3,383,128 | 5/1968 | Napple | 287/83 |
| 3,576,336 | 4/1971 | Uhlig | 287/124 |
| 1,783,016 | 11/1930 | Hook | 287/78 X |
| 2,259,460 | 10/1941 | Dexter | 24/263 DD UX |
| 2,346,706 | 4/1944 | Stoner | 24/136.3 X |
| 2,859,056 | 11/1958 | Marks | 287/20.3 |
| 3,313,560 | 4/1967 | Macchi | 287/20.3 |
| 3,384,395 | 5/1968 | Brandestini | 287/20.3 |

Primary Examiner—David J. Williamowsky
Assistant Examiner—Wayne L. Shedd
Attorney—Mason, Kolehmainen, Rathburn & Wyss

[57] ABSTRACT

A tapered end fitting for a glass fiber rod applies a substantially uniform stress to the portion of the rod falling within the end fitting, and thus can withstand tensile loadings up to the tensile strength of the rod itself. A uniform stress distribution is achieved by designing the end fitting so that it subjects to the rod to a uniform volume strain. This, in turn, is achieved either by properly tapering the inner surface of the end fitting outer jacket, or by properly choosing the characteristics of the collect which fills the space between the rod and the outer jacket of the end fitting.

11 Claims, 7 Drawing Figures

PATENTED OCT 17 1972　　3,698,749

INVENTOR:
EDWARD H. YONKERS

BY Mason, Kolehmainen
Rathburn & Wyss
ATTORNEYS

INVENTOR:
EDWARD H. YONKERS

BY Mason, Kalchmann
Rathburn & Wyss
ATTORNEYS

END FITTING

The present invention relates to end fittings for glass fiber rods, and more particularly to end fittings for glass fiber rods that must withstand high tensile loads.

The high tensile strength of rods constructed from polymer-bonded glass fibers (hereinafter called glass fiber rods) has resulted in their use in many applications where high tensile strength is required, but where steel or metal rods cannot be used. An example of this is in the construction of electrical insulators which are used to support high tension lines. These insulators must be composed of high quality dielectric material and, therefore, cannot be constructed from steel. Porcelain, from which such insulators are customarily constructed, has a high compressive strength but is relatively weak under tensile loading. Therefore, glass fiber rods are a natural complement to porcelain in high voltage insulation structures requiring high tensile strength. A glass fiber rod is used as a prestressed inner core for a ceramic insulator. Compressive loads are then absorbed by the ceramic, and tensile loads are absorbed by the glass fiber rod.

The major problem in designing such insulators has been that of gripping the ends of the glass fiber rods without introducing localized stress concentrations which become preferred locations for failure. One particularly suitable design for an end fitting is disclosed in copending patent application Ser. No. 733,131, filed on May 29, 1968, by the present inventor and assigned to the same assignee as the present application. This end fitting comprises a cylindrical steel outer jacket or housing which closely surrounds the end portion of the glass fiber rod. The inside surface of this housing is linearly tapered so that its diameter becomes larger towards the unloaded end of the rod. The space between the outer housing and the glass fiber rod is filled by an object constructed of a zinc alloy or of some other suitable material, hereinafter called a collet. The collet is forced into this space under pressure. Grooves in the glass fiber rod prevent the rod from slipping out of the collet. The inner surface of the outer jacket is machined smooth to provide a low friction surface and is lubricated with graphite or preferably molybdenum sulfide. The collet functions as a slip wedge fitting and slides within the outer jacket when an axial load is applied to the glass fiber rod. As the collet and rod slide forward within the outer jacket, the collet and rod are radially compressed by the jacket. This interfacial radial stress is distributed over the entire interface between the rod and the jacket, and thus is not concentrated at any one location on the rod.

While this design is superior to any used heretofore, examination of test samples has shown that the radial stress distribution produced by this design is not uniform but varies smoothly from one end of an end fitting to the other. Testing has shown that those rod sections subjected to the greatest stress are preferential sites for failure.

The purpose of the present invention is to keep this interfacial radial stress distribution constant over the entire length of an end fitting. This is accomplished by equalizing the volume strain or change in volume per unit of volume applied to all portions of the rod within the end fitting. When a solid is compressed, the ratio of the change in pressure to the volume strain caused by the change in pressure is called the Bulk modulus of the solid. For most solids, the Bulk modulus is a constant that does not vary significantly with pressure over wide limits. Hence volume strain and pressure change are linearly related. In the case of an end fitting the pressure change is the radial stress applied to the rod by the end fitting. If the volume strain is uniformly distributed over the length of rod within the end fitting, then the radial stress is also uniformly distributed. If the basic geometry of an end fitting is known and if certain parameters of the end fitting can be varied over the length of the end fitting to provide stress compensation, then the basic concept of providing a uniform volume strain can be used as criterion for adjusting the parameters so that a substantially uniform stress distribution is obtained. In any given case, an equation or mathematical formulation for the volume strain at each axial location within the end fitting is first obtained as a function of location and as a function of the variable parameters. The condition that volume strain be maintained relatively constant over the length of the end fitting is then imposed upon the resulting equation or mathematical formulation, and the resulting expression is then solved for the values which this condition imposes upon the variable parameters. In the specification which follows, the above general technique is applied to three different illustrative end fitting geometries.

Referring now to the drawings.

Figure 7:
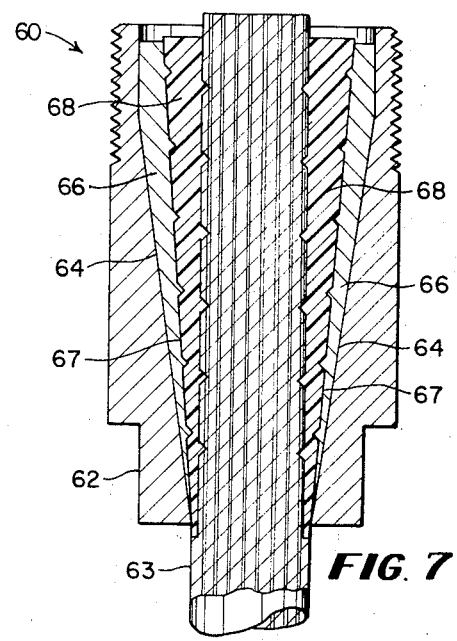
Figure 6:
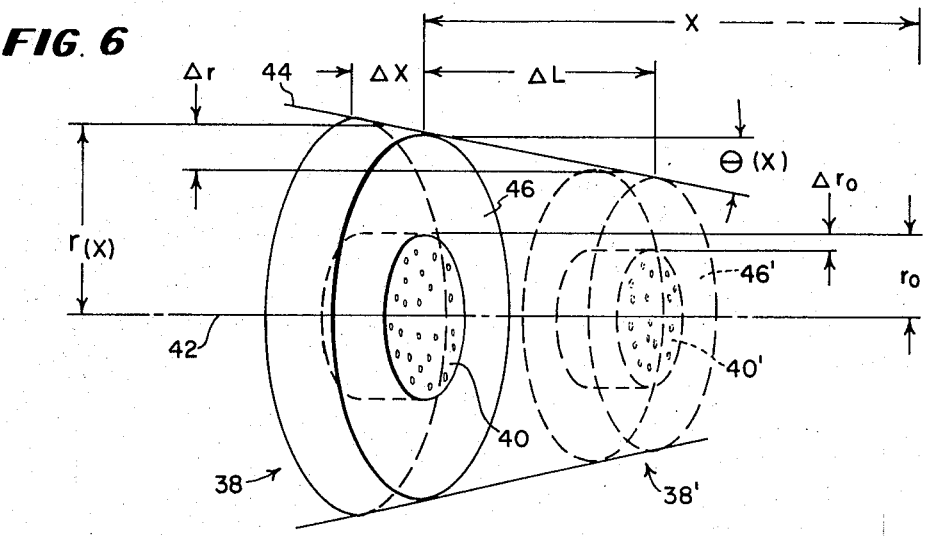

FIG. 6 is a perspective view of a frustrum that comprises a section of a glass fiber rod and collet assembly and that is shown in two different positions to illustrate the mathematical relations involved in the present invention; and FIG. 7 is a fully sectioned elevational view of an end fitting employing a partly compressible, partly noncompressible collet and designed in accordance with the principles of the present invention.

Figure 1:
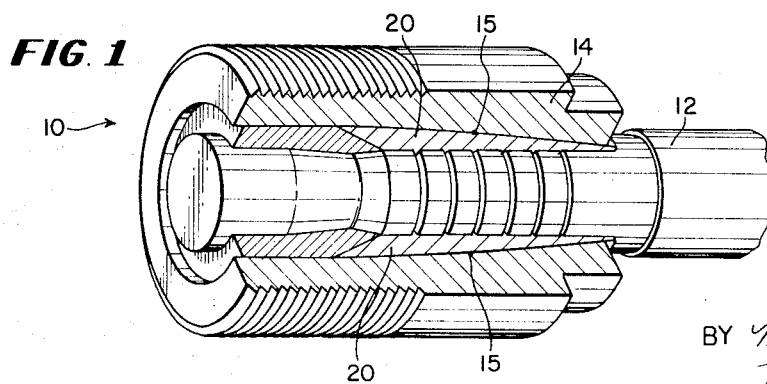
FIG. 1 is a perspective, partly sectional view of an end fitting for a glass fiber rod containing a relatively incompressible collet and designed in accordance with the principles of the present invention.
Figure 5:
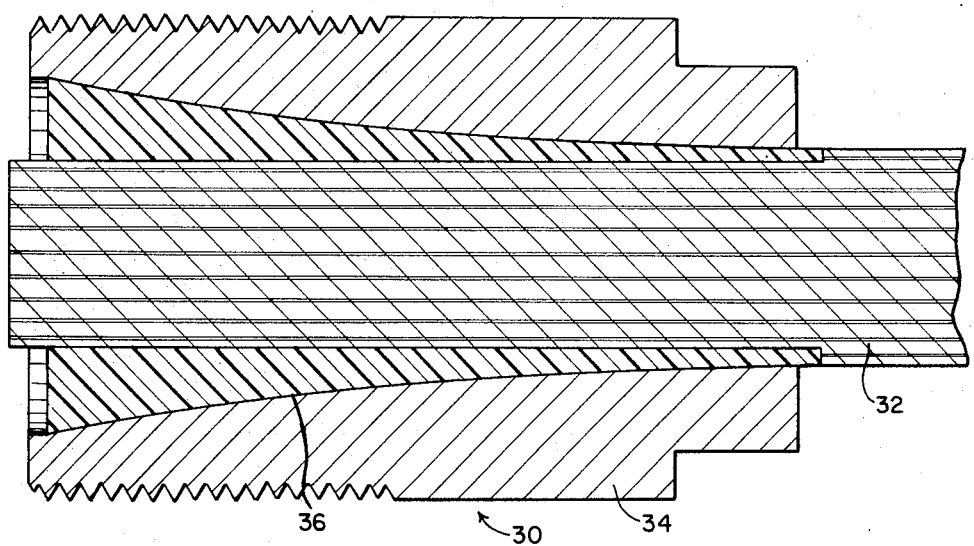
FIG. 5 is a fully sectioned elevational view of the end fitting shown in FIG. 4.
Figure 4:
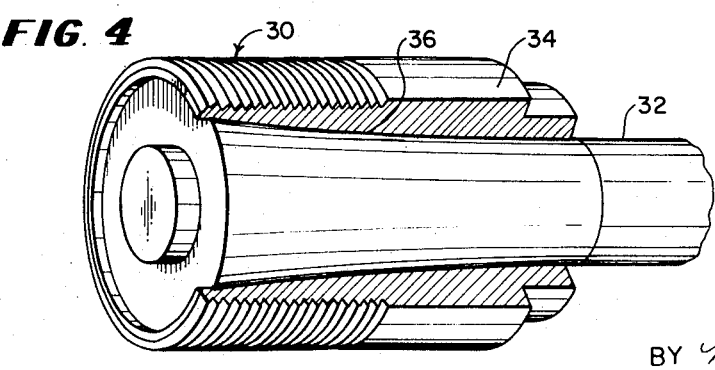
FIG. 4 is a perspective, partly sectional view of an end fitting including a compressible collet and designed in accordance with the principles of the present invention.

Referring now to FIG. 1, there is shown a typical end fitting 10 for a glass fiber rod 12. The end fitting 10 includes an outer jacket 14 having a tapered inner surface 15. The space between the tapered inner surface 15 and the glass fiber rod 12 is occupied by a filler or collet 20. The collet 20 acts as a wedge between the outer jacket 14 and the glass fiber rod 12. The collet 20 shown in FIG. 1 is constructed from a zinc alloy or some other deformable material which is relatively incompressible compared to the glass fiber rod 12. In accordance with the principles of the present invention, the inner surface 15 must be given a carefully chosen shape so that it provides a uniform stress distribution over that portion of the rod 12 lying within the end fitting 10. In this instance, this inner surface 15 becomes more parallel to the rod axis towards the unloaded end of the rod 12 and its shape is parabolic, as shown. If a compressible material were chosen for the collet 20, the inner surface then would become more parallel to the rod axis towards the loaded end of the rod 12. The resulting inner surface is shown in FIGS. 4 and 5 to be roughly exponential. If a properly designed combination collet including two different materials is provided, the inner surface of the end fitting can be left conical, as shown in FIG. 7. All of these various embodiments of the present invention will be described in detail below.

Referring now to FIG. 6, there is shown a frustrum 38 that includes an outer, annular portion 46 and an inner, cylindrical core 40. The inner cylindrical core 40 is assumed to be a narrow, cylindrical section of a glass fiber rod, such as the rod 12 shown in FIG 1. The outer annular portion 46 is assumed to be a narrow annular section of a collet which surrounds the core 40, such as an annular section of the collet 20 within the end fitting 10 shown in FIG. 1. FIG. 6 also shows in dashed lines the same frustrum 38' in a second position and labelled with primed index numbers. This second frustrum 38' represents the position of the first frustrum 38 after the inner cylindrical core 40 is subjected to an axial tensile load. It is assumed that this load causes the frustrum 38 to slide forward a distance $\Delta L$ as indicated in FIG. 6. A line 44 represents the inner surface of an outer jacket which contains the frustrum 38, for example, the inner surface 15 of the outer jacket 14 shown in FIG. 1. All distances shown in FIG. 6 preceded by a $\Delta$ are assumed to be very small and are exaggerated in FIG. 6 for the sake of clarity. The line 44 is drawn straight in FIG. 6, but in the discussion which follows it will usually be assumed that this line is straight only over distances which are small compared to the length of the end fitting. Thus, the angle $\theta$ which the line 44 makes with the horizontal varies as a function of a variable X, X being defined as the axial distance from the end of the fitting nearest the loaded end of the glass fiber rod to any point on the line 44.

In accordance with the principles of the present invention, it is desired to provide an end fitting which produces a constant volume strain in all portions of the glass fiber rod within the end fitting. Volume strain is defined as the change in volume in an incremental section of a glass fiber rod caused by axially loading the rod, divided by the volume of the section. Referring to FIG. 6, the volume strain produced in the cylindrical core 40 by axial loading is equal to the change in volume of the core 40 divided by the total volume.

The total volume V of the cylindrical core 40 is its cross sectional area ($\pi$ times the radius $r_o$ squared), multiplied by its thickness $\Delta X$:

I. $V = \pi r_o^2 \Delta X\, r_o$

The volume change $\Delta V$ produced in the core 40 when it is shifted forward a distance $\Delta L$ to the position indicated by the reference numeral 40' is given approximately by the change in radius $\Delta r_o$ of the core 40 multiplied by the perimeter $2\pi r_o$ of the core 40 and by the thickness $\Delta X$ of the core 40:

II. $\Delta V = 2\Delta r_o \pi r \Delta x$

Dividing equation II by equation I gives the volume strain:

III. $\Delta V/V = 2(\Delta r_o/r_o)$

An end fitting designed in accordance with the principles of the present invention must, therefore, have a geometry which forces the ratio of the change in the radius of the glass fiber rod to its initial radius to remain relatively constant throughout the end fitting when a tensile load is applied to the rod. If the compressibility of both the glass fiber rod and of the collet are known, then it is possible to determine mathematically what shape the inner surface of the outer jacket must have, or what characteristics the collet must have, to provide a uniform distribution of stress over all portions of the glass fiber rod within the end fitting.

As a first example, assume that the collet is constructed from a zinc alloy or some other material whose compressibility is negligible compared to that of fiberglass, as shown in FIG. 1. The volume of the outer annular portion 46 shown in FIG. 6 cannot change in this case, since this portion is incompressible. By equating the initial volume of the outer annular portion 46 to the final volume of the outer annular portion 46', the following equation is obtained, where $r(X)$ is the outer radius of the portion 46 and $\Delta r$ is the change in this outer radius when the annular portion 46 slides forward:

IV. $\pi r(x)^2 \Delta X - \pi r_o^2 \Delta X =$ $[\pi(r(X) - \Delta r)^2 \Delta X] - [\pi(r_o - \Delta r_o)^2 \Delta X]$ Neglecting the second order terms $\Delta r^2$ and $\Delta X^2$, this equation reduces to:

V. $r(X)\Delta r = r_o \Delta r_o$ $\Delta r$ in the above equation is related to $\Delta L$ and to the angle $\theta$ by:

VI. $\Delta r = \Delta L \tan \theta$ since the tangent of $\theta$ is equal to the ratio of $\Delta r$ to $\Delta L$. The tangent of $\theta$ is also equal to the slope of the line 44, so it equals the rate of change of $r(X)$ with respect to a change in X, or the derivative of $r(X)$ with respect to X:

VII. $\tan \theta = dr(X)/dX$ substituting equation VII into VI and the resulting equation into V gives:

VIII. $r(X)[dr(X)/dX] = (r_o \Delta r_o)/(\Delta L)$

The differential equation VII defines the cross sectional shape of the inner surface 15 shown in FIG. 1. X is the axial distance from the end of the jacket 14 adjacent the loaded end of the fiberglass rod 12 to any point on the inner surface 14; r is the radius from the centerline of the fiberglass rod 12 to this same point; $r_o$ is the radius of the fiberglass rod; and $\Delta r_o$ is the amount by which the radius of the fiberglass rod 12 is reduced when the rod 12 shifts a distance $\Delta L$ with respect to the end fitting 10. Equation VII implicitly includes the assumption that volume strain is to be kept constant, since both $r_o$ and $\Delta r_o$ are assumed to be invariant constants, and hence their ratio must also be a constant. The ratio of $\Delta r_o$ to $r_o$ is one-half the volume strain, as is shown by equation III.

A specific equation relating $r$ to $X$ is derived by integrating the above equation, and by picking the constants of integration to suit the geometry of the particular end fitting being designed. $\Delta L$, the distance which each incremental section of the fiberglass rod 12 moves forward, in general will be a function of $X$.

Assuming first that $\Delta L$ is a constant independent of $X$ and assuming that the distance from the center of the fiberglass rod 12 to the inner surface 15 at the end of the fitting 10 adjacent the loaded end of the rod 12 is equal to $r_o$, the following equation is obtained when equation VII is solved by separation of variables and integration:

$$r(X) = r_o[(2\Delta r_o/r_o)(X/\Delta L) + 1]^{1/2}$$

Figure 2:
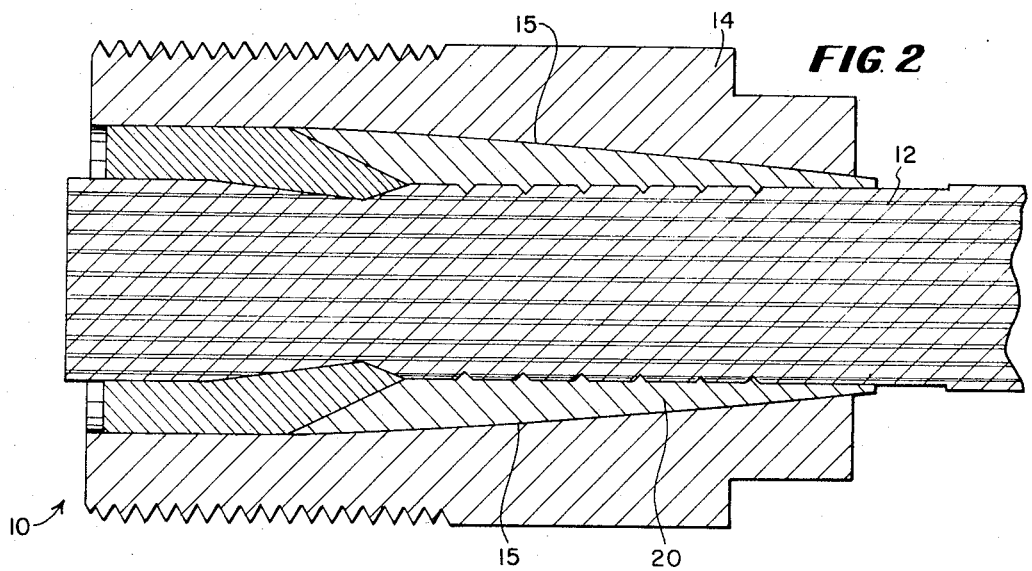
FIG. 2 is a fully sectioned elevational view of the end fitting shown in FIG. 1.

IX. OR $$r(X) = r_o[MX + 1]^{1/2}$$

where $M$ is an arbitrary constant and $r_o$ is the radius of the fiberglass rod. This equation shows the curve of the inner surface 15 to be parabolic and convex, as shown in FIGS. 1 and 2. If the inner surface 15 is shaped in accordance with equation IX, the volume strain (and therefore the radial stress) on all portions of the fiberglass rod 12 within the end fitting 10 is substantially uniform.

Figure 3:
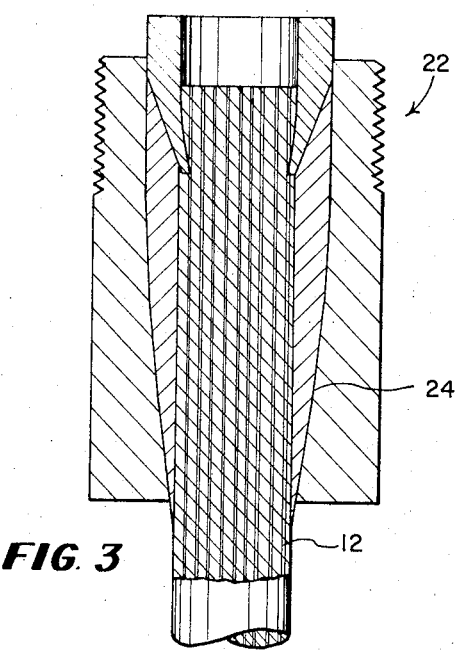
FIG. 3 is a fully sectioned elevational view of an end fitting similar to the end fitting shown in FIG. 1 but having an outer jacket with a piecewise linear inner surface rather than a curved inner surface.

The parabola shown in FIG. 2 can be approximated by straight line segments as shown in FIG. 3. The shape of the inner surface 24 of an end fitting 22 shown in FIG. 3 closely approximates the shape of the inner surface 15 shown in FIG. 2, but the surface 24 is piecewise linear rather than continuous. In most cases this approximation causes little error.

Equation IX is based on the assumption that all portions of the fiberglass rod within the end fitting 10 move the same distance $\Delta L$ when the rod 12 is loaded. This assumption is not always justifiable. If the differential equation VIII is solved under the assumption that $\Delta L$ varies linearly with $X$ a better approximation to the true state of affairs is obtained. Let it be assumed that:

X. $\Delta L = \Delta L_o - \alpha X$ where $\alpha$ is a positive number. This is equivalent to assuming that the glass fiber rod 12 stretches linearly as it is loaded so that sections of the rod 12 nearest the loaded end of the rod 12 are shifted farther than sections nearest the unloaded end of the rod 12. This will generally be the case. By substituting this equation for $\Delta L$ into equation VIII and by making the same assumptions as were made in the derivation of equation IX, the following solution is obtained:

XI.
$$r = r_o \left\{ \frac{2\Delta r_o}{r_o \alpha} \left[ l_n \frac{\Delta L_o}{\Delta L_o - \alpha X} \right] + 1 \right\}^{1/2}$$

$$r = r_o \left\{ M[l_n(NX + 1)] + 1 \right\}^{1/2}$$

where $r_o$ is the radius of the rod and $M$ and $N$ are constants. If $\Delta L$ is represented as a non-linear function of $X$, a more accurate solution for $r$ as a function of $X$ may be obtained with the aid of a computer. The above equations, however, are sufficiently accurate for most applications.

FIG. 4 shows an end fitting 30 having a collet that is formed from a compressible, epoxy material which is molded into the fiberglass rod 32. The end fitting 30 includes an outer jacket 34 which has an inner surface 36 that is tapered exponentially so as to give the collet a concave outer surface, as shown. The equations which define the shape of the inner surface 36 are derived in a similar manner to the way in which the equations which define the shape of the inner surface 15 of the end fitting 10 were derived. Referring again to FIG. 6 and assuming that the annular portion 46 has the same compressibility as the core 40, it is apparent that when the frustrum 38 moves forward, the core 40 is compressed proportionally to the amount that the annular portion 46 is compressed. Hence, the change $\Delta r_o$ in the core 40 radius $r_o$ is proportional to the change $\Delta r$ in the annular portion 46 radius $r(X)$:

XII. $\Delta r_o/r_o = \Delta r/r(X)$

Again substituting equation VII into equation VI and then substituting the equation which results into equation XII, the following differential equation is obtained:

XIII. $[1/r(X)](dr/dX) = (\Delta r_o/r_o)(1/\Delta L)$

This differential equation defines the shape of the inner surface 36. Again assuming that $\Delta L$ is constant and independent of $X$, and assuming the same end conditions as before, the following solution is found by separation of variables and integration:

$$r(X) = r_o \exp[(\Delta r_o/r_o)(X/\Delta L)]$$

XIV. OR $$r(X) = r_o \exp(MX)$$

where $r_o$ is the radius of the rod and $M$ is an arbitrary constant. Hence, the inner surface 36 has an exponential cross section, and it tapers so as to become more parallel to the axis of the glass fiber rod 32 towards the loaded end of the rod 32.

Assuming that the displacement $\Delta L$ of each incremental section varies linearly as a function of $X$ throughout the end fitting 30 (see equation X), the following solution to equation XIII is obtained:

$$r = r_o[-(\alpha/\Delta L_o)X + 1]^{-(\Delta r_o/r_o\alpha)}$$

XV. OR $$r = r_o[-MX + 1]^{-N}$$

where $r_o$ is the radius of the rod and $M$ and $N$ are constants. Equations XI and XV are only valid when $\alpha$ is greater than zero. For $\alpha = 0$ these equations are undefined; however, they can be shown to give solutions which approach the solutions given by equations IX and XIV in the limiting case as $\alpha$ approaches zero.

In the above examples, the inner surface of an end fitting outer jacket was given a shape which forced the change in the radius of the glass fiber rod, and therefore the volume strain over the length of the rod within the end fitting, to be constant over the length of the end fitting. Other techniques can also be used to achieve a uniform volume strain. For example, FIG. 7 shows an end fitting 60 for a glass fiber rod 63. The end fitting 60 comprises an outer jacket 62 having an inner surface 64 that is linearly tapered, a first incompressible collet 66 that is linearly tapered on both its inner and outer surfaces, and a second compressible collet 68 that is molded into the glass fiber rod 63. A mathematical analysis of this geometry reveals that a close approximation to a uniform stress distribution is achieved when the compressible and the non-compressible collets are of roughly the same thickness, so that the inner surface 64 has twice the slope of the interface 67 between the collets 66 and 68.

Referring once again to FIG. 6, let it be assumed that the second, compressible collet 68 is linearly tapered, is part of the glass fiber rod 63 (FIG. 7), and is included within the core 40 (FIG. 6). Then $r_o$ varies linearly with X and can be represented by:

$$\text{XVI. } r_o \triangleq R + AX$$

Let it also be assumed that the line 44 representing the inner surface 64 of the outer housing 62 (FIG. 7) is a straight line so that it may be represented by:

$$\text{XVII. } r(x) \triangleq R + BX$$

The volume strain on the inner core 40, which must be a constant independent of X, is the ratio of the volume V of the inner core 40 (equation II) to its change in volume $\Delta V$ when shifted to 40'. Since the annular portion 46 is incompressible, it does not change in volume. Hence, $\Delta V$ is equal to the change in the volume of the frustum 38, which is given by its perimeter $2\pi r(X)$ multiplied by its thickness $\Delta X$ and by the change in its radius $\Delta r$:

$$\text{XVIII. } \Delta V = 2\pi r(x) \Delta X \Delta r$$

Substitution of equation VII into equation VI, and substitution of the resulting equation into the above equation gives:

$$\text{XIX. } \Delta V = 2\pi r(x) \Delta X \Delta L [dr(x)/dx]$$

The volume V of the inner core 40 is given by equation I. Substituting the value of $r_o$ from equation XVI into equation I and neglecting the second order term $A^2 X^2$ gives:

$$\text{XX. } V = \pi(R^2 + 2RAX)\Delta X$$

Defining K to be the volume strain, K is then given by equation XX divided by equation XIX:

$$\text{XXI. } K \triangleq \Delta V/V = [2r(x)\Delta L/R^2 + 2RAX][dr(x)/dX]$$

This differential equation can be solved by separation of variables and integration, with equation XVII serving to define the integration constant by requiring that $r = R$ when $X = 0$. The following equation relating X and r results following integration:

$$\text{XXII. } KR^2 X + KARX^2 = \Delta L (r^2 - R^2)$$

Substitution of the value of r given by equation XVII into equation XXII gives the following equation:

$$\text{XXIII. } KR^2 X + KARX^2 = \Delta LBRX + \Delta LB^2 X^2$$

Since this equation has been derived on the assumption that the volume strain K is a constant, it must be identically true for all possible values of X or else the assumption that K is a constant cannot be maintained. By equating terms having like powers of X, the following two equations must be satisfied:

$$\text{XXIV. } KR^2 X = 2\Delta LBRX$$

$$\text{XXV. } KARX^2 = \Delta LB^2 X^2$$

Solving equation XXIV for B gives:

$$\text{XXVI. } B = KR/2\Delta L$$

Substitution of this value for B into equation XXV and solving the resulting equation for A gives:

$$\text{XXVII. } A = KR/4\Delta L$$

By assigning A and B the values given by equations XXVI and XXVII, equation XXIII can be identically satisfied for all values of X, and the assumption that the volume strain K is a constant independent of X can be sustained. Plugging these values for A and for B back into equations XVI and XVII gives:

$$\text{XXVIII. } r_o = R + (KR/4\Delta L)X$$

$$\text{XXIX. } r = R + (KR/2\Delta L) X$$

Hence, if the slope of the inner surface 64 ($KR/2\Delta L$) is twice the slope of the interface 67 ($KR/4\Delta L$), a uniform stress distribution is achieved.

Although the present invention has been described with reference to an illustrative embodiment thereof, it should be understood that numerous other modifications and changes will readily occur to those skilled in the art, and it is therefore intended by the appended claims to cover all such modifications and changes that will fall within the true spirit and scope of the invention.

What is claimed as new and desired to be secured by Letters Patent of the U.S. is:

1. An end fitting comprising:
    a solid, compressible rod having first and second ends, the first end of which rod is subjected to a tensile load;
    a cylindrical, non-compressible outer jacket having an inner surface which surface surrounds the second end of said rod;
    a material substance filling the space between the inner surface of said jacket and the second end of said rod, said material substance adhering to said rod and slidably engaging the inner surface of said jacket so that said rod and said material substance are free to slide within said jacket when said rod is subjected to a tensile load; and
    a nonlinear taper on the inner surface of said jacket which nonlinear taper causes said material substance to compress all portions of the second end of said rod by substantially the same amount when said rod and said material substance are shifted within said jacket by a tensile load;
    whereby the volume strain applied to the second end of said rod is uniformly distributed along the axis of the rod.

2. An end fitting as defined in claim 1 wherein the material substance is less compressible than the rod, and wherein the inner surface of said jacket is tapered nonlinearly in such a manner that a sectional view of the end fitting, in which the end fitting is sectioned by a plane that includes the rod axis, reveals the taper of the inner surface to be generally concave with respect to the rod.

3. An end fitting as defined in claim 2 wherein the concave taper of the inner surface of said jacket is formed from a plurality of straight line segments.

4. An end fitting as defined in claim 2 wherein the taper of the inner surface of said jacket, when viewed in section as in claim 21, is generally parabolic in shape.

5. An end fitting as defined in claim 4 wherein the inner surface of the outer jacket is tapered substantially in accordance with the equation $R = A(BX + 1)^{1/2}$ where $X$ is a distance measured axially along the rod from a fixed reference point and away from the tensile loaded end of the rod, where $R$ is the radial distance from the rod axis to a point on the inner surface, and where $A$ and $B$ are constants.

6. An end fitting as defined in claim 2 wherein the inner surface of the outer jacket is tapered substantially in accordance with the equation $R = A\{B[l_n(CX+1)]+1\}^{1/2}$ where $X$ is a distance measured axially along the rod from a fixed reference point and away from the tensile loaded end of the rod, where R is the distance from the rod axis to a point on the inner surface, and where $A$, $B$, and $C$ are constants.

7. An end fitting as defined in claim 1 wherein the material substance has approximately the same compressibility as does the rod, and wherein the inner surface of said jacket is tapered nonlinearly in such a manner that a sectional view of the end fitting, in which the end fitting is sectioned by a plane that includes the rod axis, reveals the taper of the inner surface to be generally convex with respect to the rod.

8. An end fitting as defined in claim 7 wherein the convex taper of the inner surface of said jacket is formed from a plurality of straight line segments.

9. An end fitting as defined in claim 7 wherein the taper of the inner surface of said jacket, when viewed in section as in claim 21, is generally exponential in shape.

10. An end fitting as defined in claim 9 wherein the inner surface of the outer jacket is tapered substantially in accordance with the equation $R = A \exp(BX)$ where $X$ is a distance measured axially along the rod from a fixed reference point and away from the tensile loaded end of the rod, where $R$ is the radial distance from the rod axis to a point on the inner surface, and where $A$ and $B$ are constants.

11. An end fitting as defined in claim 7 wherein the inner surface of the outer jacket is tapered substantially in accordance with the equation $R = A(BX+1)^C$ where $X$ is a distance measured axially along the rod from a fixed reference point and away from the tensile loaded end of the rod, where $R$ is the radial distance from the rod axis to a point on the inner surface, and where $A$, $B$, and $C$ are constants.

* * * * *

UNITED STATES PATENT OFFICE
CERTIFICATE OF CORRECTION

Patent No. 3,698,749  Dated October 17, 1972

Inventor(s) Edward H. Yonkers

It is certified that error appears in the above-identified patent and that said Letters Patent are hereby corrected as shown below:

Claim 4, column 9, line 6, "21" should read -- 2 --.

Claim 9, column 10, line 9, "21" should read -- 2 --.

Signed and Sealed this

Seventeenth Day of May 1977

[SEAL]

Attest:

RUTH C. MASON
Attesting Officer

C. MARSHALL DANN
Commissioner of Patents and Trademarks